United States Patent
Riedel et al.

(10) Patent No.: US 10,116,111 B2
(45) Date of Patent: Oct. 30, 2018

(54) METHOD AND DEVICE FOR FILAMENT-BASED WHITE LIGHT GENERATION

(71) Applicants: Deutsches Elektronen-Synchrotron DESY, Hamburg (DE); GSI Helmholtzzentrum fuer Schwerionenforschung GmbH, Darmstadt (DE)

(72) Inventors: Robert Riedel, Hamburg (DE); Franz Tavella, Menlo Park, CA (US); Michael Schulz, Schenefeld (DE); Mark James Prandolini, Hamburg (DE)

(73) Assignees: DEUTSCHES ELEKTRONEN-SYNCHROTRON DESY, Hamburg (DE); GSI HELMHOLTZZENTRUM FUER SCHWERIONENFORSCHUNG GMBH, Darmstadt (DE)

( * ) Notice: Subject to any disclaimer, the term of this patent is extended or adjusted under 35 U.S.C. 154(b) by 215 days.

(21) Appl. No.: 14/681,697

(22) Filed: Apr. 8, 2015

(65) Prior Publication Data
US 2015/0295383 A1    Oct. 15, 2015

(30) Foreign Application Priority Data
Apr. 14, 2014  (EP) .................... 14001352

(51) Int. Cl.
*H01S 3/00*  (2006.01)
*G02F 1/35*  (2006.01)
(Continued)

(52) U.S. Cl.
CPC ............ *H01S 3/0092* (2013.01); *G02F 1/353* (2013.01); *G02F 1/3551* (2013.01);
(Continued)

(58) Field of Classification Search
CPC ..................... H01S 3/0092; G02F 2001/3528
See application file for complete search history.

(56) References Cited

U.S. PATENT DOCUMENTS 5,198,837 A *  3/1993  Ikshizaka ........... G02B 26/0816
                                                  347/256
2002/0175149 A1 * 11/2002  Gruber ................. G02F 1/3525
                                                  219/121.6
(Continued)

FOREIGN PATENT DOCUMENTS

WO    2013078215 A1   5/2013

OTHER PUBLICATIONS

Bradler et al., "Femtosecond continuum generation in bulk laser host materials with sub-µJ pump pulses", Appl. Phys. B., vol. 97, pp. 561-574 (2009).

(Continued)

*Primary Examiner* — Xinning Niu
*Assistant Examiner* — Sean Hagan
(74) *Attorney, Agent, or Firm* — Caesar Rivise, PC

(57) ABSTRACT

A method of generating white light pulses (2) with a white light generation device (100) includes the steps of coupling pump laser pulses (1) into a white light generation crystal (10), generating the white light pulses (2) by an optically non-linear conversion of the pump laser pulses (1) in the white light generation crystal (10) and detecting at least one pulse characteristic of at least one of the pump laser pulses (1) and the white light pulses (2), wherein the white light generation device (100) is controlled using a control loop device (30) and the white light generation device (100) is adjusted in dependency on the at least one detected pulse characteristic. Furthermore, a white light generation device (100) for generating white light pulses (2) is described.

9 Claims, 1 Drawing Sheet

(51) Int. Cl.
*G02F 1/355* (2006.01)
*H01S 3/10* (2006.01)

(52) U.S. Cl.
CPC .... *H01S 3/0014* (2013.01); *G02F 2001/3528* (2013.01); *H01S 3/10038* (2013.01)

(56) References Cited

U.S. PATENT DOCUMENTS

| | | | |
|---|---|---|---|
| 2003/0147122 A1 | 8/2003 | Jovanovic et al. | |
| 2005/0105082 A1* | 5/2005 | Wada | G01M 11/00 356/239.2 |
| 2005/0168826 A1* | 8/2005 | Koulikov | G02B 6/4206 359/641 |
| 2005/0226287 A1* | 10/2005 | Shah | G01J 11/00 372/25 |
| 2008/0219302 A1* | 9/2008 | Nakayama | G02F 1/37 372/21 |
| 2008/0225382 A1 | 9/2008 | Nicholson et al. | |
| 2008/0225383 A1 | 9/2008 | Theberge et al. | |
| 2010/0321767 A1 | 12/2010 | Borguet et al. | |
| 2011/0019701 A1* | 1/2011 | Pedersen | H01S 3/08 372/14 |
| 2014/0091240 A1* | 4/2014 | Thomsen | G01N 21/255 250/504 R |

OTHER PUBLICATIONS

Emons et al., "Sub-10-fs pulses from a MHz-NOPA with pulse energies of 0.4 µJ", Optics Express, vol. 18, No. 2, pp. (2010) 1191-1196.

Riedel et al., "Long-term stabilization of high power optical parametric chirped-pulse amplifiers", Optics Express, vol. 21, No. 23, pp. 28987-28999 (2013).

Riedel et al., "Power scaling of supercontinuum seeded megahertz-repetition rate optical parametric chirped pulse amplifiers", Optics Letters, vol. 39, No. 6, pp. 1422-1424 (2014).

Examination Report dated Apr. 16, 2018 re EP Patent Application No. 14 001 352.5-1209, Deutsches Elektronen-Synchrotron DESY, et al.

* cited by examiner

METHOD AND DEVICE FOR FILAMENT-BASED WHITE LIGHT GENERATION

BACKGROUND OF THE INVENTION

The invention relates to a method of generating white light pulses (WL pulses) with a white light generation device (WLG device). In particular, the invention relates to a method of filament-based white light generation using a non-linear optical frequency conversion of pump laser pulses in a white light generation crystal (WLG crystal). Furthermore, the invention relates to a WLG device, in particular including a WLG crystal for filament-based generation of white light pulses. Applications of the invention are available e.g. in the fields of generating seed light pulses for optical parametric chirped-pulse amplification (OPCPA) of laser pulses, physical measurement techniques, like white light interferometry or spectrometry, metrology and material processing using light pulses.

For describing the background of the invention, particular reference is made to the following publications:
[1] US 2010/0321767 A1;
[2] US 2003/0147122 A1;
[3] US 2008/0225383 A1;
[4] M. Emons et al. in "Optics Express" vol. 18, 2010, p. 1191-1196;
[5] R. Riedel et al. in "Optics Express" vol. 21, 2013, p. 28987-28998;
[6] R. Riedel et al. in "Optics Letters" vol. 39, 2014, p. 1422-1424; and
[7] M. Bradler et al. in "Appl. Phys. B" vol. 97, 2009, p. 561-574.

It is generally known that ultrashort laser pulses (laser pulses having a pulse duration below 100 fs) have a broad range of applications, which make use of the short pulse durations associated with a broadband spectrum and a high peak-power of the individual pulses. Depending on the particular application, there is an interest in creating the pulses with maximum amplitude, minimum pulse duration and/or minimum pulse to pulse amplitude fluctuations.

Typically, high-power ultrashort laser pulses are created using OPCPA-sources, wherein a broadband seed pulse is amplified with a narrowband pump laser pulse in a non-linear optical crystal. Using a non-collinear geometry of the seed pulses and pump laser pulses (non-collinear OPA, NOPA, see [1] to [6]), a broad range of wavelengths can be amplified with the pump laser pulses, thus allowing the creation of ultrashort laser pulses with a duration below 10 fs. The pump laser pulses are created e.g. with a solid state laser oscillator, like a Ti-Sapphire oscillator or a fiber oscillator, in combination with a fiber amplifier and/or a regenerative pulse amplifier and/or a multipass amplifier. The broadband seed pulses can be generated by a white light generation process (WLG process, see e.g. [7]), which can be driven with a fraction of the pump laser pulses. The WLG process includes focusing laser pulses having a duration in a range of e.g. 100 fs to 1 ps into a non-linear optical crystal, where a so-called light filament is created delivering pulses with a spectral bandwidth from the visible to the infrared region (supercontinuum pulses, WL pulses).

In practice, an instability of the WLG process has been found, including variations or interruptions of the WLG process and resulting in limited applications of the NOPA technique. A certain improvement of long-term stability has been described in [4]. However, this long-term stability is restricted to a range of hours, and it can be obtained with a sophisticated optical set-up operated by an experienced user only. On the contrary, routine applications of ultrashort laser pulses would require a continuous operation on a timescale of days or more without user adjustments even with changing surrounding conditions. Long-term stabilization of an optical parametric chirped-pulse amplifier also has been described in [5]. However, the stabilization was related to the OPCPA process as such rather than to the WLG process.

Stabilized WLG processes are required not only in the generation of high-power laser pulses, but also with other applications of ultrashort laser pulses, e.g. in metrology or for physical measuring techniques.

DESCRIPTION OF THE INVENTION

The objective of the invention is to provide an improved method of generating white light pulses, which is capable of avoiding disadvantages of conventional techniques. It is a particular objective of the invention to generate the white light pulses with improved long-term stability and/or reduced user interventions. It is a further objective of the invention to provide an improved white light generation device, which is capable of avoiding disadvantages of conventional techniques. In particular, the white light generation device is to be capable of a robust operation under practical conditions and with routine implementations.

These objectives are solved with a method and a device of the invention.

According to a first general aspect of the invention, a method of generating white light pulses with a WLG device including a WLG crystal is provided. Based on an optically non-linear frequency conversion, pump laser pulses (or: driver pulses) are converted to the WL pulses in the WLG crystal. The pump laser pulses are coupled, preferably focused, into the WLG crystal with pump pulse parameters, in particular pump pulse amplitude (pulse intensity) and pump pulse duration such that a light filament is excited in the WLG crystal and the WL pulses are created with a spectral supercontinuum characteristic. The supercontinuum characteristic covers a wavelength range determined by the material of the WLG crystal, e.g. a wavelength range of about 450 nm to 1500 nm. According to the invention, the WLG device is controlled in dependency on at least one pulse characteristic of the pump laser pulses and/or the white light pulses. The at least one pulse characteristic is used for a feedback-control of the WLG device, in particular for controlling, preferably stabilizing, the generation of the WL pulses.

According to a second general aspect of the invention, a WLG device is provided, which includes a WLG crystal being capable of creating WL pulses by a non-linear optical, filament-based frequency conversion of pump laser pulses. According to the invention, the WLG device includes a detector device and a control loop device. The detector device is arranged for detecting at least one pulse characteristic of the pump laser pulses and/or the white light pulses. The detector device is included in the control loop, wherein the at least one detected pulse characteristic provides a controlled quantity (controlled variable), which is input to the control loop for controlling the WLG device. Preferably, the WLG device is configured for implementing the method according to the above first aspect of the invention.

Advantageously, the invention provides a practical long-term stabilization of the optically non-linear white light generation for the first time. The WL pulse generation can be stabilized in terms of both of the output energy of the WL
} pulses and the spectrum thereof. The inventors have recognized that critical pulse parameters are available, which do not only provide a diagnosis of the pump laser pulses and/or WL pulses, but also allow a feedback-control of the WLG device. Various actuation elements have been identified, which allow an automatic adjustment of the WLG device using a control unit of the control device without a human intervention. The inventive WLG device including the detector device and the control loop device provides a self-stabilizing white light source. A robust feedback-control has been obtained, which advantageously allows an operation of the WLG device by a non-experienced user, e.g. as a component of a laser pulse amplifier or a measuring apparatus. Long-term stability with a continuous operation of the WLG device (operation without an operator intervention) has been obtained in a range of days or even weeks.

Advantageously, various critical parameters are available, which can be monitored and detected as the at least one pulse characteristic. According to a first embodiment of the invention, the at least one detected pulse characteristic is capable of indicating a damage of the WLG crystal. Alternatively or additionally, according to a second embodiment, the at least one detected pulse characteristic is capable of indicating a normal working range of the WLG crystal.

Regarding the first embodiment (detecting at least one damage indicating pulse characteristic), the inventors have found that an instability of conventional WLG sources or even an interfering interruption of the WLG process results from the occurrence of damages of the WLG crystal. Damages may comprise e.g. distortions in the bulk volume of the WLG crystal resulting from extreme light intensities in the supercontinuum filament, or distortions on a WLG crystal surface resulting from sticking or baking dust particles. Furthermore, the inventors have found that the at least one damage indicating pulse characteristic can be used as the controlled quantity in the feedback loop for adjusting the WLG device.

According to a preferred variant of the first embodiment, a lateral focus position of the pump laser pulses in the WLG crystal is adjusted in dependency on a deviation of the detected pulse characteristic and a reference damage characteristic. According to this embodiment, the WLG process can be continued by feedback-controlled changing the lateral focus position in response to the detection of a crystal damage.

The pump laser pulses are directed along a pump light path through the WLG crystal, defining an axial direction of the pump laser pulses and the WL pulses. Adjusting the lateral focus position of the pump laser pulses in the WLG crystal comprises a mutual displacement of the WLG crystal and the path of the pump laser pulses in a lateral direction perpendicular to the axial direction. Advantageously, the WLG crystal and the pump light path can be automatically moved relative to each other in dependency on the detected pulse characteristic, in particular in response to the detection of a damage, such that a damage-free position of the pump laser pulse focus is obtained.

Preferably, the WLG crystal is positioned on a translation stage including a translation drive, which provides an actuating element of the control loop device. With this embodiment, the control unit of the control loop device is coupled with the translation drive. In response to the detection of a crystal damage, the translation stage of the WLG crystal is actuated for changing the lateral focus position. Alternatively, the actuating element for adjusting the lateral focus position in the WLG crystal comprises a mirror drive of a deflection mirror which is arranged for laterally shifting the pump light path relative to the WLG crystal.

According to a particularly preferred modification of the first embodiment, the energy (amplitude, power, pulse intensity) of the pump laser pulses can be temporally reduced before and during the step of adjusting the lateral focus position of the pump laser pulses. Advantageously, a migration of the crystal damage during the adjusting step is avoided with this energy reduction. The energy of the pump laser pulses is set in the normal working range at the changed damage-free lateral focus position after the adjusting step only.

According to further preferred features of the invention, the damage indicating pulse characteristic comprises an amplitude and/or a spatial beam profile of a spectral fraction of the WL pulses, which is equal to the spectral range of the pump laser pulses. This spectral fraction (or: spectral pump light fraction of the WL pulses) can be detected by filtering, e.g. wavelength selective reflecting the spectral pump light fraction from the WL pulses generated by the WLG crystal. The detected pulse characteristic is compared with a reference damage characteristic, which correspondingly comprises a reference amplitude and/or a reference profile of the WL pulses. With this embodiment of the invention, the detector device preferably comprises a photodiode and/or a camera device, like e.g. a CCD camera.

The inventors have found that the occurrence of a crystal damage specifically influences the amplitude and the spatial beam profile of the spectral pump light fraction. If a damage occurs in the WLG crystal, like e.g. a point defect in the bulk crystal or an in-burned dust particle on a crystal surface, the amplitude of the spectral pump light fraction has a damage-specific value compared with the amplitude of the pump laser pulses. Detecting this damage-specific amplitude value allows the detection of the crystal damage. Thus, the amplitude of the spectral pump light fraction is compared with a reference amplitude, e.g. the damage-specific value or another damage-free reference. Depending on the result of this comparison, the lateral focus position is changed if a damage has been detected. Furthermore, in case of the crystal damage, the spectral pump light fraction has a characteristic irregular deformation compared with a reference profile. The reference profile is e.g. a regular, in particular circular beam profile of the pump laser pulses. Accordingly, detecting the irregular spatial beam profile of the spectral pump light fraction indicates the crystal damage. Again, depending on the result of a comparison of the spatial beam profile with the reference profile, the lateral focus position can be changed.

Regarding the second preferred embodiment (detecting at least one normal working range indicating pulse characteristic), the inventors have found that stabilizing the filament creation in the WLG crystal is facilitated if the WLG crystal is operated in a predetermined normal working range. The normal working range is spanned by pump pulse parameters, in particular pump pulse energy and pump pulse duration of the pump laser pulses, and characteristics of coupling the pump laser pulses into the WLG crystal, in particular a coupling geometry, e.g. perpendicular incidence, and a focus size in the WLG crystal. Each WLG crystal has a specific normal working range, which can be obtained from numerical simulations or experimental tests. The inventors have found that the instabilities of conventional WLG sources are caused if pump pulse parameters or features of coupling the pump pulses into the WLG crystal leave the normal working range, e.g. due to drifting operation conditions of a pump laser device or changing environmental conditions. Furthermore, the inventors have found that various actuating elements are available, which allow an adjustment of the WLG device so that the normal working range is kept. Advantageously, instabilities of the pump laser device can be compensated for by a feedback control of the amplitude (intensity) of the pump laser pulses in the WLG crystal.

According to preferred variants of the second embodiment, feedback-controlling the WLG device includes adjusting an axial focus position in the WLG crystal (position of the pump laser pulse focus along the pump light path through the WLG crystal), an amplitude of the pump laser pulses and/or a pulse duration of the pump laser pulses in dependency on a deviation of the at least one pulse characteristic and at least one normal working range characteristic indicating the normal working range of the WLG crystal. For adjusting the normal working range, the pump laser pulses are provided with a pump pulse energy in a predetermined pump energy range between a minimum pump pulse energy and a maximum pump pulse energy. With a pump energy below the minimum pump pulse energy, the normal working range cannot be obtained as the energy is not sufficient for the WLG process. On the other hand, with a pump energy above the maximum pump pulse energy, the normal working range cannot be obtained as the WLG crystal could be destroyed. The pump energy range is obtained from test experiments and/or from features of the WLG crystal.

The axial focus position defines the intensity of the pump laser pulses at the focus position. For adjusting the axial focus position, preferably the translation drive of the translation stage carrying the WLG crystal is used as an actuating element of the control loop device. Alternatively, the actuating element for adjusting the axial focus position comprises a lens drive of a focusing lens for axially shifting the pump laser pulse focus relative to the WLG crystal. Additionally or alternatively, the effect of influencing the intensity of the pump laser pulses at the focus position can be obtained by adjusting the pump laser pulse amplitude with the amplitude modulating device and/or by adjusting the pulse duration of the pump laser pulses by controlling the pump laser device.

The amplitude modulating device providing the actuating element of the control loop is arranged in the pump light path between the pump laser device and the WLG crystal. With a preferred example, the amplitude modulating device comprises an acousto-optical modulator (AOM). The AOM deflects a controllable fraction of the pump laser device output out of the pump light path. Advantageously, this deflection by the AOM can be used for both of detecting the pump laser device output and adjusting the pump laser pulse amplitude, thus controlling the normal working range of the WLG crystal. As a further advantage, the AOM has a fast response characteristic. With an alternative example, the amplitude modulating device comprises a combination of a motorized half-wave plate and a thin film polarizer (TFP). The orientation of the half-wave plate relative to the TFP polarization direction determines the fraction of the pump laser device output transmitted to the WLG crystal. Alternatively, other polarizer combinations, an electro-optic modulator or even a variable grey scale filter can be used as the amplitude modulating device.

According to particularly preferred features of the invention, the normal working range indicating pulse characteristic comprises an amplitude, an amplitude fluctuation, a spectrum and/or spatial beam profile of the WL pulses generated in the WLG crystal. The inventors have found that leaving the normal working range specifically influences these parameters. The feedback control changes the axial focus position, the pump laser pulse amplitude and/or the pump laser pulse duration until the WL pulse amplitude is above a predetermined reference amplitude, the WL pulse amplitude fluctuation is below a reference amplitude fluctuation, the WL pulse spectrum is matched to a reference spectrum and/or the WL pulse beam profile is matched to a regular beam profile of the WL pulses. With this embodiment of the invention, the detector device preferably comprises a photodiode for detecting the amplitude or amplitude fluctuation, and/or a camera device, like e.g. a CCD camera, for detecting the spatial beam profile.

Preferably, the inventive method of generating white light pulses includes a self-adjustment of the WLG device at a start-up phase of the WLG process and/or keeping the WLG process with stabilized WL pulse output during the running WLG process. Self-adjustment at the start-up phase comprises adjusting the WLG device with predetermined start parameters, in particular within the normal working range. Continuously stabilizing the WLG process comprises continuously monitoring the at least one pulse characteristic and stabilizing the operation of the WLG device using the control loop device. Continuously monitoring the at least one pulse characteristic includes a permanent detection or a periodically repeated detection at time intervals depending on detector characteristics and control dynamics, e.g. below 100 ms for short-term control or above 100 ms for long-term control.

BRIEF DESCRIPTION OF THE DRAWINGS

Further details and advantages of the invention are described in the following with reference to the attached drawings, which show in:

Preferred embodiments of the invention are described in the following with particular reference to the feedback-control of the WLG device. Details of the WLG process, the operation of the pump laser device and the application of the WL pulses are not described as far as they are known as such from prior art. It is emphasized that the implementation of the invention is not restricted to the optical set-up as shown in FIG. 1, but rather possible with a modified optical set-up including the WLG crystal and being capable of feedback-control of the WL process. Furthermore, FIG. 1 is a schematic representation only. In practice, additional optical components can be provided, e.g. further imaging, deflecting and/or polarizing elements.

FIG. 1 schematically illustrates an embodiment of the WLG device 100 including the WLG crystal 10, the detector device 20 and the control loop device 30, in combination with the pump laser device 200. The pump laser device 200 generally comprises a pulse laser creating pump pulses 1, e.g. with a duration below 1 ps and an average pulse energy of about 1 to 10 µJ. The repetition rate is above 100 kHz, e.g. above 1 MHz, in particular up to 4 MHz. With preferred examples, the pump laser device 200 comprises a Titan-Sapphire laser or another solid state laser, e.g. a fiber laser or an Yb-based solid state laser, e.g. an Innoslab-laser.

Figure 1:
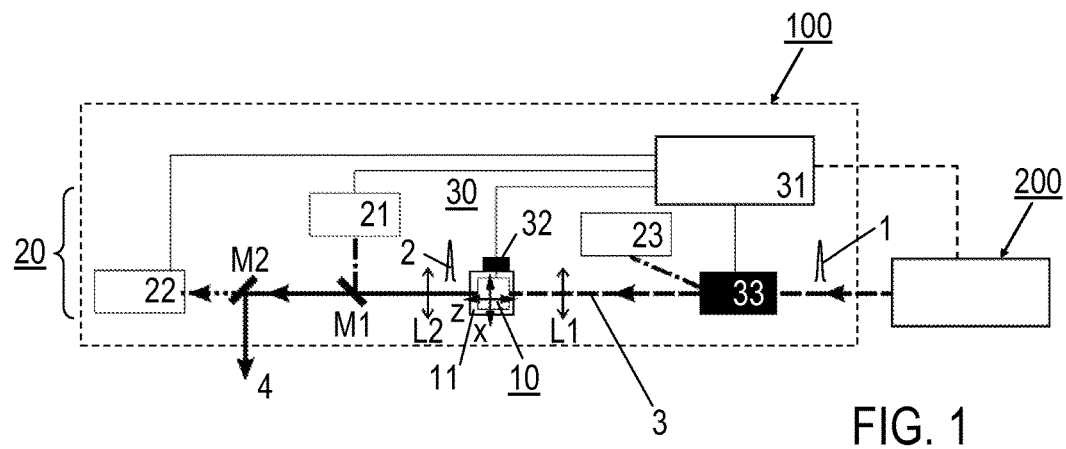
FIG. 1: a schematic illustration of a preferred embodiment of the white light generation device according to the invention.

The WLG crystal 10 is a solid dielectric crystal, which is suitable for filament-based white light generation using a pump pulse duration in a range of e.g. 100 fs to 2 ps. With preferred examples, the WLG crystal 10 comprises a sapphire crystal, a CaF crystal, a YAG crystal (Yttrium Aluminum Garnet), a KGW crystal (Potassium-Gadolinium Tungstate crystal) or a KYW crystal (Potassium-Yttrium Tungstate crystal). The WLG crystal 10 has typical lateral dimensions of e.g. 6 mm·6 mm. The axial dimension (thickness along beam path) is selected in dependency on the material and the applied pulse duration of the pump pulses, e.g. in a range of 2 mm to 20 mm.

The detector device 20 comprises at least one, preferably three detector units 21, 22 and 23, which are described with further details below. The control device 30 includes the detector device 20 and a control unit 31, which is coupled with each of the detector units 21, 22, 23 and actuating elements (translation drive 32, amplitude modulating device 33) as described with further details below. Optionally, the control unit 31 is additionally coupled with the pump laser device 200 for adjusting the pump laser pulse amplitude and/or duration. Furthermore, multiple control units can be provided each being coupled with one of the detector units. It is noted that the invention can be implemented with one single detector unit or two detector units only. For example, the third detector unit 23 can be omitted if the pump laser device is provided with a separate stabilization.

The pump light path 3 runs from the pump laser device 200 via the amplitude modulating device 33, a first focusing element L1 (e.g. at least one lens and/or mirror), the WLG crystal 10, a second focusing element L2 (e.g. at least one lens and/or mirror), a first dichroic dielectric mirror M1 and a second dichroic dielectric mirror M2 to an output 4. With the illustrated embodiment, the direction of the beam path 3 is indicated as the z-direction (axial direction), while the directions perpendicular to the z-direction are indicated as x- and y-directions (lateral directions, y perpendicular to the drawing plane).

The WLG crystal 10 is arranged on a translation stage 11. The translation stage 11 comprises a support for mounting the WLG crystal 10 and a translation drive 32, like e.g. a piezo-electric drive or a stepping motor, which is adapted for a 2-(x-y)- or preferably 3-(x-y-z)-dimensional translation of the WLG crystal 10 relative to the beam path 3 of the pump laser pulses 1. The x- and/or y-translation is used for a lateral adjustment of the WLG crystal 10 in response to a damage detection, and the z-translation is used for a normal working range adjustment, in particular an adjustment of the pump pulse intensity within the WLG crystal 10, as outlined below.

The first detector unit 21 comprises a photodiode and/or a camera detector, like a CCD camera. The first detector unit is arranged for monitoring the spectral pump light fraction of the WL pulses 2, in order to detect a status "crystal damage" or "no crystal damage" of the WLG crystal 10. The spectral pump light fraction is separated from the WL pulses 2 with the first dichroic dielectric mirror M1, which is optimized for a reflection of wavelengths e.g. above 1000 nm and a high transmission for wavelengths e.g. below 1000 nm. With a center wavelength of the pump pulses 1 e.g. in the range above 1000 nm, the fraction of the WL pulses 2 corresponding to the spectral range of the pump laser pulses is reflected to the first detector unit 21. With the photodiode, an amplitude of the spectral pump light fraction is sensed, while the CCD camera measures a spatial beam profile of the spectral pump light fraction.

The first detector unit 21 is connected with the control unit 31, which is arranged for receiving output signals from the first detector unit 21 and processing the output signals, e.g. image processing of the image collected with the CCD camera, for providing the pulse characteristic of the WL pulses, which is specific for the damage related status of the WLG crystal 10. If the amplitude and/or profile of the spectral pump light fraction deviate from a predetermined reference amplitude and/or profile, a damage of the WLG crystal 10 is detected. Practical values of the reference amplitude depend on the particular WLG crystal 10 used. They can be obtained from test measurements or from numerical simulations.

The second detector unit 22 is arranged for monitoring the WL pulses 2, in particular in a spectral range deviating from the spectral range of the pump pulses 1. To this end, the second dichroic dielectric mirror M2 is used, which is optimized for high transmission of wavelengths below 650 nm and high reflection for wavelengths above 650 nm. Advantageously, this allows a monitoring of a spectral range of short wavelengths in the WL pulse spectrum. The inventors have found that the range of short wavelengths provides a particularly sensitive measure for detecting as to whether the WL pulses 1 are created in the stable normal working range of the WLG crystal 10. Alternatively, the dichroic mirror M2 can be replaced by a narrow band filter transmitting a narrow spectral interval of the WL pulses 2 only.

Preferably, the second detector unit 22 comprises a photodiode and/or a camera device, like e.g. a CCD camera. The second detector unit 22 is connected with the control unit 31, which is arranged for receiving the output signals from the detector unit 22, and processing the output signals, e.g. image processing, for providing the pulse characteristic of the WL pulses 1.

With the photodiode, an amplitude and/or an amplitude fluctuation of the WL pulses 1 can be monitored. If the amplitude is above a predetermined reference amplitude, the WLG process is in the normal working range of the WLG crystal 10. If the amplitude fluctuation, in particular on a timescale of 1 s, is below a predetermined reference amplitude fluctuation, e.g. 1% rms, the normal working range is detected as well. Practical values of the reference amplitude or the reference amplitude fluctuation depend on the pulse characteristic of the pump pulses 1 and the particular WLG crystal 10 used. They can be obtained from test measurements or from numerical simulations.

With the CCD camera of the second detector unit 22, the spatial beam profile of the WL pulses 1 can be monitored. With a regular beam profile, the normal working range is indicated, while an irregular beam profile is an indication for a WLG process outside the normal working range of the WLG crystal 10.

With alternative embodiments of the invention, the first and/or second detector unit 21, 22 may include a spectrometer detector, which is arranged for sensing a spectrum of the spectral pump light fraction or WL pulses, resp. The spectrum may be used as a specific pulse characteristic indicating a crystal damage or the normal working range as well.

The third detector unit 23 comprises e.g. a photodiode, which is arranged for monitoring the amplitude of the pump pulses 1. Depending on the type of the amplitude modulating device 33, a fraction of the pump pulses 1 is directly deflected to the third detector unit 23, or an additional semi-transmissive mirror (not shown), like e.g. a glass plate is used for reflecting a fraction of the pump pulses 1 to the third detector unit 23. With the illustrated example, the amplitude modulating device 33 comprises an AOM, deflecting an s-polarized fraction, e.g. about 5%, of the pump laser light to the photodiode and transmitting the remaining p-polarized pump laser light for driving the WLG process.

The third detector unit 23 is connected with the control unit 31 as well. The control unit 31 receives the output signal of the photodiode as the pulse characteristic of the pump pulses 1. The control unit 31 is adapted for controlling the amplitude modulation device 33 and/or the pump laser device 200 in dependency on the output signal of the third detector unit 23 in order to stabilize the amplitude and/or duration of the pump pulses 1. If a stabilized pump laser device 200 is used having an internal stabilization of the pulse amplitude and pulse duration, the connection of the control unit 31 with the pump laser device 200 can be omitted.

Figure 2:
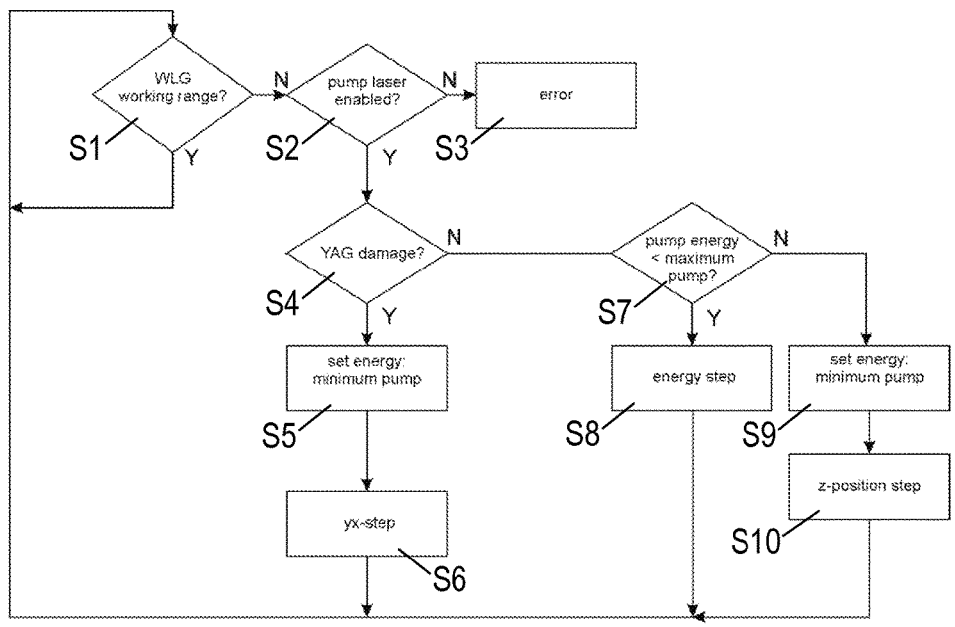
FIG. 2: a flowchart illustrating a preferred embodiment of a control process used according to the invention.

The WLG device 100 is operated as follows. With the pump laser device 200, pump pulses 1 are directed along the pump light path 3 through the amplitude modulating device 33 and the first focusing element L1 to the WLG crystal 10. With the first focusing element L1, the pump pulses 1 are focused into the WLG crystal 10, where the pump pulses 1 are frequency-converted into the WL pulses 2. The WL pulses 2 leave the WLG crystal 10 collinearly with the direction of the pump pulses 1, i.e. along the z-direction. With the second focusing element L2, the beam of the WL pulses 2 is recollimated. After transmission through the dichroic mirrors M1 and M2, the WL pulses having a duration below 100 fs and a broadband characteristic are supplied at the output 4 for the particular application, e.g. as the seed pulses in a NOPA device. The broadband characteristic covers a wavelength range, which depends on the spectral bandwidth of the WL pulses initially created, e.g. 450 nm to 1500 nm, and on spectral features of the filter mirrors M1 and M2. With the filter mirrors M1 and M2, the broadband characteristic covers a range of e.g. 500 nm to 1500 nm. Preferably, the operation of the WLG device 100 is stabilized with a process as shown in FIG. 2. This process is implemented by the control unit 31. Firstly, the operation of the WLG crystal 10 in the normal working range is continuously tested with step S1. To this end, the output signal of the second detector unit 22 is compared with predetermined reference parameters by the control unit 31. As long as the normal working range is kept, the monitoring step S1 is continued. Step S1 is conducted permanently or periodically with a certain test time interval. If the normal operation range has been left, the operation of the pump laser device 200 is tested (step S2). In case of a failure, the operation is stopped (S3). If the pump laser device 200 is in operation mode, the damage status of the WLG crystal 10 is tested with step S4.

For the damage detection (step S4), the output signal of the first detector unit 21 is compared with predetermined reference parameters by the control unit 31. If a crystal damage has been detected, the energy of the pump pulses 1 is reduced with step S5. Subsequently, the translation drive 32 of the translation stage 11 is activated for x- and/or y-translation (step S6) to obtain a fresh focus position in the WLG crystal 10. Via steps S1 and S2, the damage status of the WLG crystal 10 is tested again (step S4). Translations and tests are repeated until the status "no crystal damage" is obtained. Advantageously, the detection of the damage and the translation of the WLG crystal 10 can be provided on a short time scale without substantially impairing the application of the WL pulses. The interruption resulting from the energy reduction and translation of the WLG crystal 10 is negligible with most practical applications of the invention, so that the required continuous operation of the WLG device (operation without an operator intervention) is obtained.

If no further damage is detected, the energy of the pump pulses 1 is tested with step S7. With the amplitude modulation device 33, the amplitude of the pump pulses 1 is stepwise increased until the normal working range of the WLG crystal 10 is obtained (step S8). To this end, the routine via steps S8, S1, S2, S4 and S7 is repeated until a predetermined maximum pump pulse energy is obtained. If the energy of the pump pulses 1 cannot be further increased with the amplitude modulation device 33 at the amplitude increasing step S8 and the maximum pump pulse energy is not sufficient for reaching WL pulses indicating the normal working range, the pump pulse energy is set on a predetermined minimum pump pulse energy with the amplitude modulation device 33 and/or the pump laser device 200 (step 9) and an axial translation (z-translation) of the WLG crystal 10 can be conducted (step S10) in order to optimize the focus of the pump pulses in the WLG crystal 10. Subsequently, the pump pulse energy is increased using steps S7 and S8, until the normal working range of the WLG crystal 10 is obtained.

The implementation of the invention is not restricted to the scheme of FIG. 2. With an alternative example, the damage status of the WLG crystal 10 can be monitored continuously, and the normal working range of the WLG crystal 10 can be adjusted subsequently, if a damage has been detected and the lateral focus has been adjusted.

Advantageously, with the feedback control scheme of FIG. 2, a continuous stable operation of the WLG device 100 is obtained. A human intervention of a user is not necessary.

The WL pulse generation is completely self-stabilized. As a potential damage within the WLG crystal 10 or on a surface thereof has a size of about 20 μm and the WLG crystal 10 has a characteristic lateral dimension of about 6 mm, multiple x- and y-translations are possible allowing the use of a single WLG crystal 10 for a long-term operation of days, weeks or even months.

The features of the invention disclosed in the above description, the drawings and the claims can be of significance both individually as well as in combination for the realization of the invention in its various embodiments.

What is claimed is:

1. A method of generating white light pulses with a white light generation device, comprising the steps of:
   coupling pump laser pulses into a white light generation crystal,
   generating the white light pulses by an optically non-linear conversion of the pump laser pulses in the white light generation crystal,
   detecting at least one pulse characteristic of at least one of the pump laser pulses and the white light pulses, wherein the at least one pulse characteristic is capable of indicating a normal working range of the white light generation crystal; and
   controlling the white light generation device using a control loop device by adjusting an axial focus position of the pump laser pulses along a propagation axis of a beam in the white light generation crystal in dependency on a deviation of the at least one pulse characteristic of the at least one pulse characteristic and at least one normal working range characteristic indicating the normal working range of the white light generation crystal.

2. The method according to claim 1, wherein the at least one pulse characteristic includes at least one of
   an amplitude of a spectral pump light fraction of the white light pulses,
   a spatial beam profile of a spectral pump light fraction of the white light pulses, and
   a spectrum of the spectral pump light fraction, wherein the spectral pump light fraction is a fraction of the white light pulses in the spectral range of the pump laser pulses.

3. The method according to claim 1, wherein
the step of controlling the white light generation device further includes adjusting the amplitude of the pump laser pulses with an acousto-optical modulator or a combination of a motorized half-wave plate and a thin film polarizer.

4. The method according to claim 1, wherein the at least one pulse characteristic includes at least one of
an amplitude of the white light pulses,
an amplitude fluctuation of the white light pulses,
a spectrum of the white light pulses,
a spatial beam profile of the white light pulses,
an amplitude of the pump laser pulses, and
a pulse duration of the pump laser pulses.

5. The method according to claim 1, including the steps of
monitoring the at least one pulse characteristic, and
stabilizing the operation of the white light generation device using the control loop device.

6. A white light generation device being configured for generating white light pulses, comprising:
a white light generation crystal being adapted for creating the white light pulses by an optically non-linear conversion of pump laser pulses,
a detector device including at least one detector unit being adapted for detecting at least one pulse characteristic of at least one of the pump laser pulses and the white light pulses, wherein the at least one pulse characteristic is capable of indicating a normal working range of the white light generation crystal, and
a control loop device coupled with the detector device and being adapted for adjusting an axial focus position of the pump laser pulses along a propagation axis of a beam in the white light generation crystal in dependency on a deviation of the at least one pulse characteristic the at least one pulse characteristic and at least one normal working range characteristic indicating the normal working range of the white light generation crystal.

7. The white light generation device according to claim 6, wherein
the detector device includes a first detector unit being adapted for detecting at least one of an amplitude, a spatial beam profile and a spectrum of a spectral pump light fraction of the white light pulses, wherein the spectral pump light fraction is a fraction of the white light pulses in the spectral range of the pump laser pulses.

8. The white light generation device according to claim 7, wherein the detector device includes at least one of
a second detector unit being adapted for detecting at least one of an amplitude, an amplitude fluctuation, a spectrum and a spatial beam profile of the white light pulses, and
a third detector unit being adapted for detecting at least one of an amplitude and a pulse duration of the pump laser pulses.

9. The white light generation device according to claim 8, wherein
the control loop device is further adapted for adjusting the amplitude of the pump laser pulses with an acousto-optical modulator or a combination of a motorized half-wave plate and a thin film polarizer.

\* \* \* \* \*